United States Patent [19]
Akgulian et al.

[11] 3,731,469
[45] May 8, 1973

[54] CONVERTIBLE GANG LAWN MOWER

[75] Inventors: Sahag C. Akgulian; Donald G. Haffner, both of Racine, Wis.; Sherman C. Heth, Sturtevant, Wis.

[73] Assignee: Jacobsen Manufacturing Company, Racine, Wis.

[22] Filed: Jan. 24, 1972

[21] Appl. No.: 220,193

[52] U.S. Cl. ........................................56/7, 56/12.6
[51] Int. Cl. ..............................................A01d 75/30
[58] Field of Search........................56/6, 7, 13.6, 16.2, 56/16.3, 10.8, 12.6

[56] References Cited
UNITED STATES PATENTS

| | | | |
|---|---|---|---|
| 3,106,811 | 10/1963 | Heth et al. | 56/7 |
| 3,058,281 | 10/1962 | Lewis | 56/13.6 X |
| 3,613,337 | 10/1971 | Akgulian et al. | 56/7 |
| 1,944,584 | 1/1934 | Stegeman et al. | 56/7 |
| 3,007,297 | 11/1961 | Halls et al. | 56/DIG. 1 |
| 3,583,139 | 6/1971 | Purrer | 56/370 |

Primary Examiner—Louis G. Mancene
Assistant Examiner—J. A. Oliff
Attorney—Arthur J. Hansmann

[57] ABSTRACT

A convertible gang lawn mower having a supporting vehicle and a plurality of lawn mowers pivotally mounted on the vehicle to be raised and lowered thereon. A drive connection exists between a driving mower and a driven mower, and a limit connector is also attached between the mowers for limiting the relative motion therebetween. Storage supports are included in the machine for storing the drive connector and the limit connector when they are disconnected between the mowers so that only the driving mower is left in mowing position and the driven power is placed in the stored or transport position on the machine. Hydraulic lift cylinders are on the machine for lifting the mowers, and an additional crank-type lift is also on the machine for lifting one of the lowers when the hydraulic cylinders are not in use.

7 Claims, 5 Drawing Figures

Patented May 8, 1973
3,731,469
2 Sheets-Sheet 1
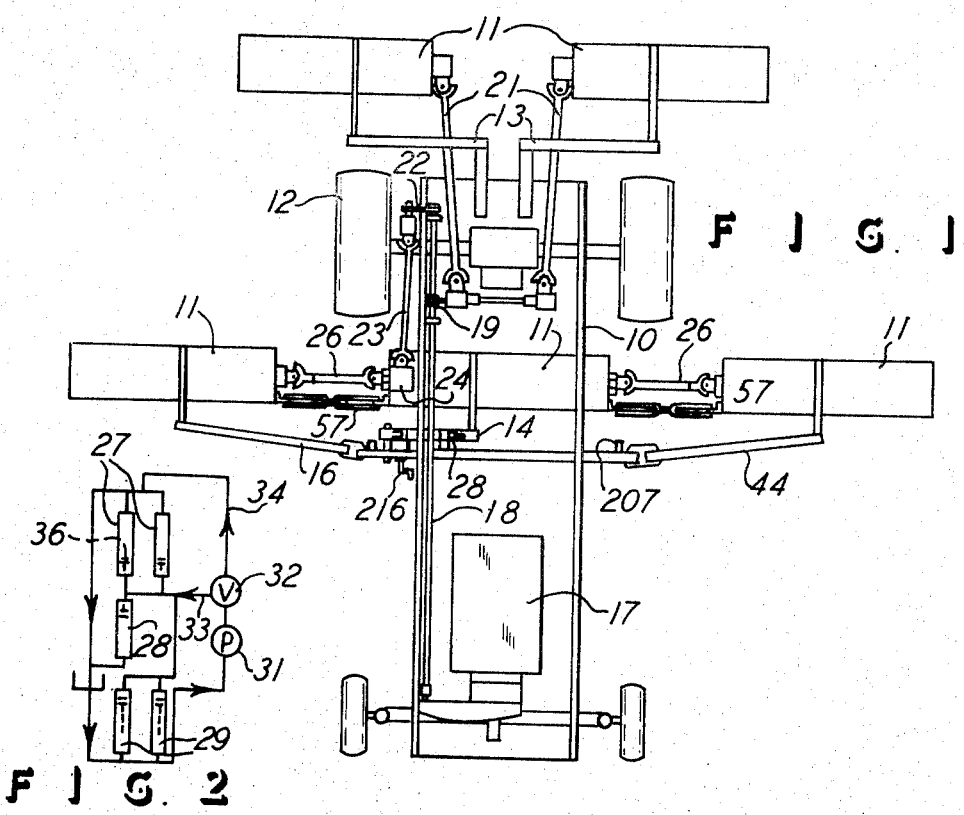
FIG. 1
FIG. 2
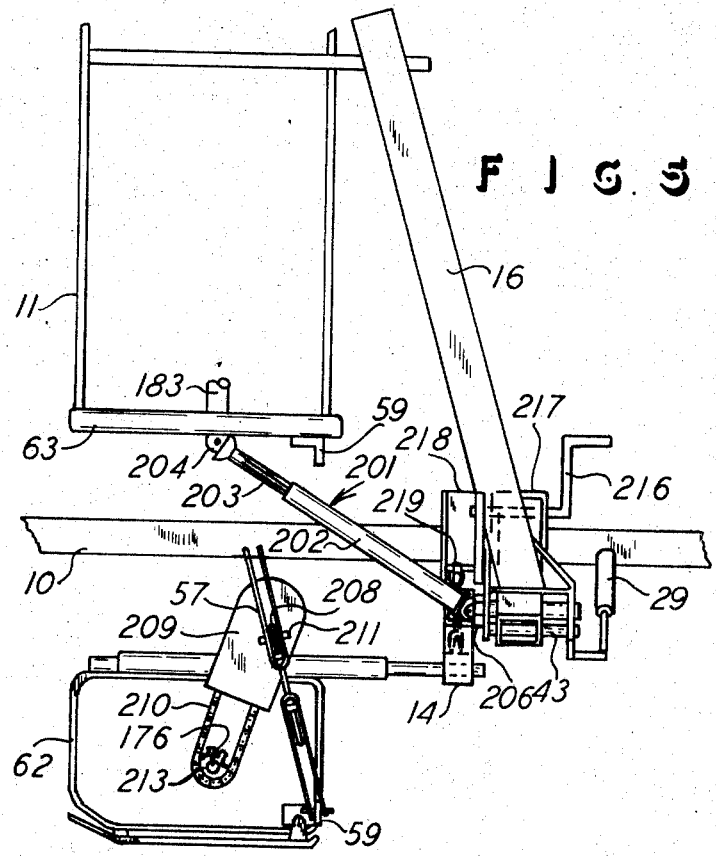
FIG. 3

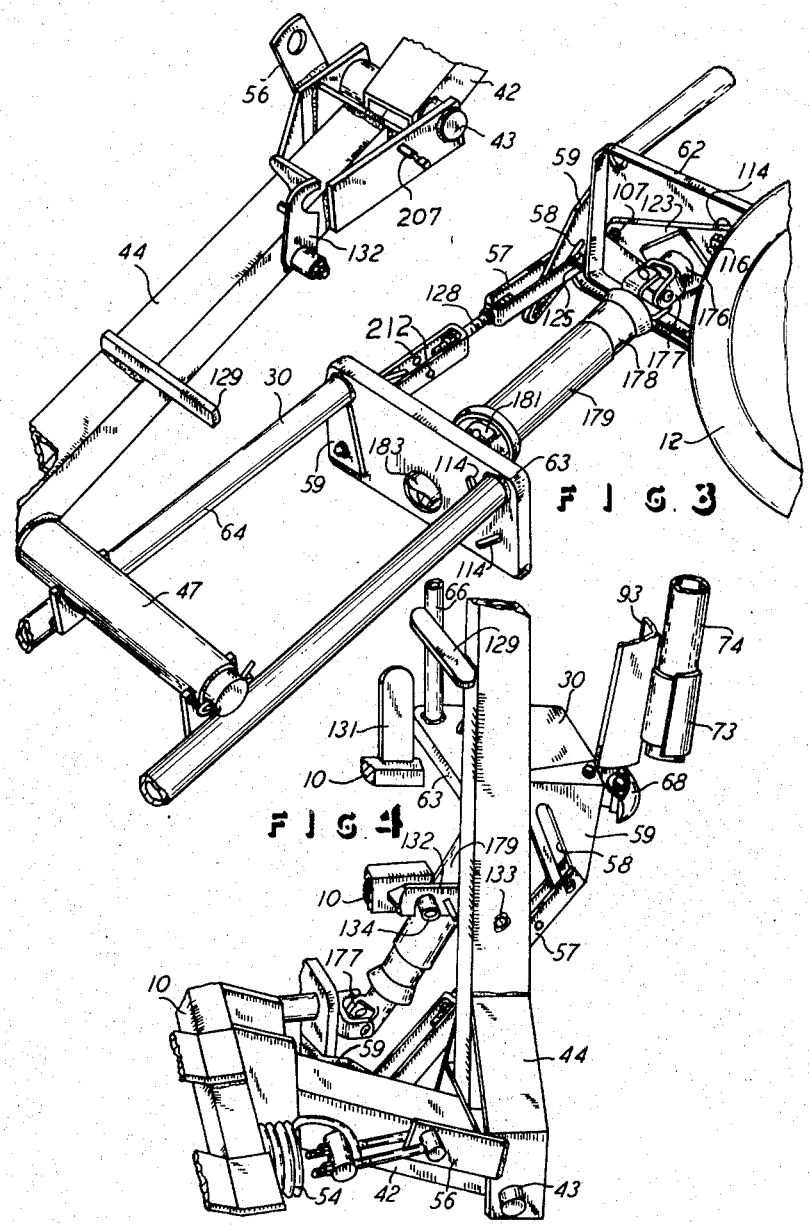

3,731,469

CONVERTIBLE GANG LAWN MOWER

This invention relates to a gang lawn mowing machine, and, more particularly, it relates to a gang lawn mower having a plurality of mowers of which some can be in the mowing position while others are in the transport position, and the machine is therefore convertible between one number of operative mowers to another number of operative mowers.

BACKGROUND OF THE INVENTION

Gang lawn mowing machines are commonly known, and they exist in many different forms of construction. One such example is shown in U.S. Pat. No. 3,613,337 wherein five mowers are shown, and these mowers can be raised from a ground-engaging operating position to an elevated transport position. Prior art mowing machines of this type are not known to be convertible between one number of mowers to another number of mowers, for instance, converting from the five gang to a three gang by raising only two of the five mowers to an inoperative position. That is, when one or two of the five mowers is raised, this action commonly causes one or more of the remaining mowers to also be raised, so the mowers do not remain on the ground for mowing, and therefore the machine is either in the mowing position or in the transport position, but it is not convertible in the number of mowers in the mowing position. This is true since the mowers are connected together so that the raising of one mower will automatically cause it to pull upon and raise one or more of the other mowers.

Still further, the prior art gang mowing machines are not fully versatile in being arranged for either manual lift of the mowers or for power lift, such as hydraulic cylinders. That is, the machines are basically arranged so that they must have either only a manual lift or a hydraulic lift, and they are not susceptible to being arranged for application of either or both of these types of lifts, at least not with the other features of either lifting or alternately not lifting one or more of the mowers when the other mowers are raised. Still another concern of the prior art is to interrupt the drive to the mower cutters when the mower is in the raised position, so that the mower is no longer moving its cutter and thus is not unnecessarily wearing itself out, nor is it a safety hazard.

Accordingly, the present invention is intended to provide an improved type of gang mowing machine which considers the aforementioned problems and which provides answers thereto. Specifically, the present invention provides a gang mower which is convertible between the number of mowers which can be readily and easily positioned in the mowing position, for instance, converting a five gang mower to a three gang mower.

Another object of the present invention is to provide a gang mowing machine wherein the mowers are interconnected in their drive and the connection can be readily and easily disconnected when one or more of the mowers is to be placed in an inoperative position, and the disconnected drive connection can be readily and easily stored on the machine. In addition to this particular desirable feature of this invention, it is also a feature that the pivot limit connector between the mowers is readily and easily disconnected and stored on the machine. In the instances of storing both of these connectors, the present invention provides for a secure storing so that the mower drive does not extend to parts which are no longer operating, and there is therefore no wearing of the parts unnecessarily and there is no safety hazard, and the parts are also stored in a secure position so that they do not vibrate and therefore are in a safe and secure position.

Still another object of this invention is to provide a lawn mowing machine which may be arranged for either a manual lifting of the mowers or for a hydraulic lifting of the mowers, and the connections between the mowers are suitable and desirable for either type of lift.

Other objects and advantages will become apparent upon reading the following disclosure in light of the accompanying drawing.

BRIEF DESCRIPTION OF THE DRAWINGS

FIG. 1 is a diagramatic top plan view of a mowing machine incorporating one embodiment of this invention.

FIG. 2 is a schematic view of the hydraulic system for the mowing machine of FIG. 1.

FIG. 3 is an enlarged front perspective view of a portion of the machine shown in FIG. 1.

FIG. 4 is a view of a fragment of the machine shown in FIG. 1, similar to that shown in FIG. 3, but being from the side opposite from FIG. 3 and showing a portion of one mower in the raised position.

FIG. 5 is an enlarged end elevational view of the machine shown in FIG. 1, but showing a fragment of one of the mowers in the raised position.

DETAILED DESCRIPTION OF THE PREFERRED EMBODIMENT

FIG. 1 shows the lawn mowing machine of this invention, and it will be seen that there is a supporting vehicle 10 having five reel type lawn mowers 11. Further, the general arrangement, except as described and disclosed herein, is similar to that disclosed in U.S. Pat. No. 3,613,337. Thus the mowers 11 are pivotally mounted on the vehicle or tractor 10 which is of course supported on the ground by means of the ground wheels shown, such as the front wheels 12. The two forwardly located mowers 11 are mounted on pivot arms 13 and the center mower 11 is mounted on a pivot arm 14 and the two side or wing mowers 11 are mounted on respective pivot arms 16. The vehicle 10 is shown to have an engine designated 17, and a drive shaft 18 extends from the engine unit 17 and forwardly to a drive take-off 19 which is suitably connected to the drive shafts 21 connected to the forward mowers 11 and thus driving the mowers 11. It will of course be understood that the mowers 11 have cutters, such as shown in the said patent, and the mowers are of the reel type, all as shown in said patent.

Another drive take-off 22 connects between the drive shaft 18 and a drive shaft 23 which extends to a gear box 24 on the center mower 11. Thus the center mower 11 has its reel and reel shaft driven, as more clearly mentioned later, and the wing mowers 11 connect to the center mower 11 through the telescoping splined type of shafts 26, and thus the wing mowers 11 are driven from the center mower 11 which is therefore the driving mower.

The five mowers are therefore pivotally or articularly mounted on the vehicle 10, and FIG. 2 shows a schematic hydraulic system for presenting and actuating hydraulic lift cylinders, there being one for each of the five mowers 11. Thus, the two front mowers 11 have two hydraulic lift cylinders 27 suitably connected between the vehicle 10 and the mower lift arms 13; and there is a center mower lift cylinder 28, and there are two wing mower lift cylinders 29, all three of these cylinders 28 and 29 are also suitably connected between the vehicle 10 and the respective mower lift arms 14 and 16, for raising and lowering the respective mowers 11 between the lowered mowing position and the raised transport position. FIG. 2 also shows a hydraulic pump 31 and a hydraulic valve 32, all connected in the hydraulic system shown so that the valve can control the flow of fluid to the five hydraulic cylinders, for both raising and lowering the five mowers under the influence of hydraulic pressure, through either hydraulic line 33 or 34, which lines extend to opposite ends of the cylinders relative to their pistons 36, as shown in each of the five cylinders.

FIG. 3 shows details of that heretofore described, and, for this purpose, the right wing mower is fragmentarily shown and is designated 30, and it is seen connected to the fragment of the center mower. Also, the vehicle frame is shown to have a portion 42 presenting a pivot pin 43 on which the mower arm is mounted and which is designated 44 in FIGS. 3 and 4. The mower 30 has a tube 47 affixed thereto, and the arm 44 has a shaft telescoped within the tube 47 for pivot mounting of the wing mower 30, as shown. FIG. 4 also shows that a tension spring 54 connects to a plate 56 on the arm 44 for urging the arm 44 into the substantially upright position shown in FIG. 4 to thus place the mower 30 in the transport or inoperative raised position shown. A pivot limit connector 57 is pinned at its opposite ends to the mower 30 and center mower 11 to limit relative pivotal action between the two mowers. Thus the connector 57 engages a slot 58 on brackets 59 on each of the two mowers, and the connector 57 is shown to have the adjustable threaded connector 128 for the understandable adjustment in the length of the connector 57 to regulate the limit of pivot between the two mowers, as mentioned. Thus the mower respective side plates 62 and 63, and their respective frames, such as the pieces designated 64 and 66, are interconnected in the manner shown and described. Also, it will be understood that when the mowers are in their lowered and mowing position, skids 68 support the mowers on the ground, in the usual manner. The mowers have mounting pieces 73 which connect to cross tubes 74, and they also have the usual bed knife 93 extending across the mower, all in a conventional manner and such as shown in the aforementioned patent.

FIG. 3 shows a bolt 107 supporting a mower drive connection by extending through an opening in the mower plate 62, and a slot 114 in the plate 62 receives another bolt 116, all so that a drive connection plate 123 can be attached to the side plate 62. This arrangement provides for the connection of the telescoping shaft 178, 179 between the mowers, and thus it will be seen that the limit connector 57, by its pin 125 received in slots 58, will limit the pivot of the mowers and thus prevent the separation of the telescoping shafts. That is, the center mower has a driving shaft 176 extending to a universal joint 177 which is connected to the inner telescoping shaft 178 which in turn connects to the outer telescoping shaft 179 having the universal joint 181. The joint 181 is integral with the shaft 183 which provides the reel shaft for the wing mower 30.

In manually raising the wing mower, it will be noted that there is a handle 129 on the pivot arm 44, and there is a latch 132 on pivot pin 133 on arm 44. The latch 132 engages a pin 134 on the vehicle 10, so that the arm 44 and its attached mower 30 can be maintained in the raised position shown in FIG. 4. However, when the wing mowers are raised, the limit connector 57 is extended to its fullest so that it will create an upward pull on the center mower 11 and thus the center mower is also raised. That is, placing the wing mower in transport position automatically places the center mower in the same position, so the unit cannot be converted from say a five gang mower to a three gang mower, that is as far as concerns the construction thus far described.

FIG. 5 shows the wing mower opposite from the mower 30 in the raised position also, and this wing mower is on the left side of the vehicle, compared to the wing mower 30 on the right side of the vehicle. However, FIG. 5 shows the drive connector and the pivot limit connector between the two mowers both disconnected. Thus, the drive connector designated 201 is of the telescoping shaft type having the outer portion 202 and the inner portion 203, identical to the telescoping and splined pieces 178 and 179 in FIG. 3. FIG. 5 shows that the piece 203 has a universal joint 204 connected to the wing mower shaft 183 which is the cutter reel shaft for the wing mower. FIG. 5 further shows that the other end of the shaft 201 is disconnected from the center mower shaft 176, so there is no drive between the center mower and the raised wing mower. The shaft 201 therefore has a conventional type of quick disconnect 206 which can be connected to the center mower shaft 176 and which can be readily and conventionally disconnected therefrom and placed in a stored position, as shown in FIG. 5, when the wing mower is raised. Thus, FIGS. 1 and 3 show that the vehicle has two storage pins 207 which receive each of the drive shafts 179 and 201 when the shafts are disconnected from the respective ends of the center mower 11. It will further be obvious and understood that the quick disconnect 206 is of a conventional construction and preferably is of a snap type which fits over the extending end of the shaft 176 for being in the drive position between the mowers, and it also fits on to the pin 207 to be in the stowed position as seen in FIG. 5, and each wing mower 11 has this arrangement, as indicated by the two storage pins 207 on the sides of the mowing machine and by the quick disconnect 206.

The limit connector 57 is disconnected from the bracket 59 on the wing mower, and the connector is stowed on the center mower as seen in FIG. 5. Thus, the center mower has a bracket 208 on a chain guard 209 and a pin 211 extends through openings 212 in the connector 57 for storing the connector in the substantially upright position shown in FIG. 5. That is, the drive from the center gear box 24 is through a drive chain 210 and onto the sprocket 213 which is mounted on the center mower shaft 176, and the chain guard 209 carries the mounting bracket 208 for pinning the connector 57 thereto, as described.

With this arrangement, it will therefore be understood that the two wing mowers can be disconnected from their drive relation with the center mower, by means of the quick disconnect 206, and they can be disconnected through the limit connectors 57. Since the drive is disconnected at the center mower, there is no useless driving of the drive shaft 201, and there is no safety hazard in having the wing mower cutters operating when they are in the raised position. Further, because the limit connector 57 is disconnected, the center mower can remain on the ground in the mowing position, and it would otherwise be raised by the limit connector 57 when the wing mowers are raised, thus, in this arrangement, the machine can be converted from the five gang mower to a three gang mower.

Also, the hydraulic cylinders 27, 28 and 29 can be readily incorporated in the machine and they can be used for power lifting of the mowers, if desired. Again, even in that instance, the machine can be converted from a five gang to a three gang machine. Still further, as seen in FIG. 2, when the mowers are raised by the hydraulic system, the front mowers contract as their pistons 36 move further into the cylinders, but the rear lift cylinders 29 extend in the lifting action, so that the hydraulic fluid can move from the rear lift cylinders and to the front lift cylinders, and thereby an optimum type of operation is achieved, and only a minimum quantity of hydraulic fluid is required for this type of system.

FIGS. 1 and 5 show that the center mower can still be lifted even though the lift connection is disconnected between the wing mowers and the center mower. That is, since the lift or limit connection 57 is disconnected in FIG. 5, the center mower can still be manually lifted, if there is no hydraulic system applying. Such manual lift includes a crank 216 which is supported on the frame piece 217 and which engages a rotatable piece 218 which in turn is connected to a chain 219 attached to the center mower lift arm 14. Thus, rotation of the crank 216 will rotate the piece 218 about the axis of the crank 216 and this will cause the chain 219 to pull up on the lift arm 14, so the center mower can be placed in a raised or transport position, when desired.

What is claimed is:

1. In a gang lawn mowing machine, a supporting vehicle, a plurality of lawn mowers with movable cutters, pivot means between said vehicle and said mowers for articularly mounting said mowers on said vehicle for supporting said mowers thereon between a lowered mowing position and a raised transport position, said mowers including one driving mower and at least one drive mower powered through said driving mower, a drive connection between said driving mower and said driven mower for transmitting the drive between said cutters of the said two mowers, the improvement comprising disconnect means included in said drive connection and being physically separable from one of said mowers for interrupting the drive to said cutter of said driven mower, and storage means supported on said machine and being arranged to releasably fixedly receive said drive connection for storing said drive connection when the latter is separated from said one of said mowers, so that said driven mower can be in the raised transport position without having its said cutter being driven, and thereby convert said gang lawn mower to a fewer number of operating said lawn mowers.

2. The gang lawn mower as claimed in claim 1, wherein said drive connection is a splined telescoping shaft, and said disconnect means is a universal joint quick-disconnect device on the end of said shaft, and said storage means is a pin fitted to said quick-disconnect device for storing said shaft.

3. The gang lawn mower as claimed in claim 2, including a detachable connector extending between said driving and said driven mowers and being connected therebetween for limiting relative motion between the said two mowers to secure said splined telescoping shaft against separation of itself, and additional storage means supported on said machine for storing said connector when the latter is detached to permit relative movement between said two mowers so that said driven mower can be in the raised transport position while said driving mower is in the lowered mowing position.

4. The gang lawn mower as claimed in claim 3, including hydraulic cylinders mounted on said machine and being connected with each of said lawn mowers for raising and lowering of said lawn mowers.

5. The gang lawn mower as claimed in claim 4, wherein there are five of said mowers, and said hydraulic cylinders being arranged and connected to have two thereof extend and two thereof contract, upon lifting the four respective said mowers, and the four said cylinders having hydraulic connections therebetween for directing the fluid from said extending said two cylinders to the retracting said two cylinders, for optimum use of the fluid in the system.

6. The gang lawn mower as claimed in claim 3, including lifting means mounted on said machine and connected to said driving mower for raising the latter.

7. The gang lawn mower as claimed in claim 1, wherein said machine includes five said lawn mowers, with three said lawn mowers being in one row extending across said machine and with the center one of said three being the driving mower and the outer two of said three being the driven mowers, said disconnect means being on each side of said driving mower and adjacent thereto, to permit terminating the drive to said cutters of both said driven mowers at said driving mower.

* * * * *